United States Patent [19]

Ramunas

[11] Patent Number: 4,850,765
[45] Date of Patent: Jul. 25, 1989

[54] SELF-LOCKING TOOL AND SOCKET

[75] Inventor: Valdas S. Ramunas, Euclid, Ohio

[73] Assignee: Kennametal Inc., Latrobe, Pa.

[21] Appl. No.: 134,402

[22] Filed: Dec. 17, 1987

[51] Int. Cl.⁴ .................. B23C 5/26; B23B 31/06
[52] U.S. Cl. ................... 409/234; 409/232;
  408/239 A; 82/160; 279/1 A; 279/1 TS
[58] Field of Search ............. 82/36 R, 36 B; 279/1 A,
  279/1 SG, 1 TS, 29, 79; 408/238, 239 R, 239 A;
  409/231, 232, 234

[56] References Cited

U.S. PATENT DOCUMENTS

| 3,365,205 | 1/1968 | Riveglia | 279/77 |
| 3,851,562 | 12/1974 | Tomita et al. | 279/1 TS |
| 3,962,777 | 6/1976 | Stoilov | 279/1 TS |
| 4,673,319 | 6/1987 | Ishikawa | 409/234 |
| 4,768,282 | 9/1988 | Rieck et al. | 29/568 |

FOREIGN PATENT DOCUMENTS 3506901 8/1986 Fed. Rep. of Germany ..... 279/1 A
16976 2/1978 Japan ..................... 409/233
2016309 9/1979 United Kingdom ............ 279/1 TS Primary Examiner—Frederick R. Schmidt
Assistant Examiner—William E. Terrell
Attorney, Agent, or Firm—Thomas R. Trempus

[57] ABSTRACT

A self-locking tool and socket body combination includes a tool holder with a male section which may be received in a socket in the socket body. Tool grippers of a tool loading device grip onto an annular V-groove on the tool holder and also act on an actuator. The actuator is linked to a first and second wedge surface which are moved laterally inwardly against the urging of spring means. When the tool grippers are released, the spring means urge the first and second wedge surfaces laterally outwardly into engagement with first and second wedge follower surfaces in the socket body and this automatically locks the tool holder axially within the socket body without any other manual or automatic means required to lock the tool holder within the socket.

22 Claims, 3 Drawing Sheets

SELF-LOCKING TOOL AND SOCKET

BACKGROUND OF THE INVENTION

Tool holders have been used in many prior art applications to mount tools of differing sizes, yet the tool holder has a male portion receivable in a socket, e.g., a rotatable spindle socket, and the tool holder may readily be changed by tool grippers engaging an annular V-groove on the tool holder. In many cases, the male portion is a conically tapered shank, and includes a central retention knob engageable by some form of locking device. The retention knob is firmly gripped by a locking mechanism, and is pulled tightly into the spindle. This tool holding method requires a spindle with a built-in locking mechanism, such as a hydraulically operated drawbar and a locking device. Since most machining operations require a rotating spindle, the locking device has to rotate with the spindle. To transmit the hydraulic locking force, a rotating coupling must be employed, and this concept adds expense to a machine tool and complicates the spindle design.

U.S. Pat. No. 2,931,659 showed a tool holder with a drive flange with a slot to receive a drive key for rotation, and with locking lugs manually rotatable to lie outside the flange of the tool.

U.S. Pat. Nos. 3,599,996; 4,032,163; and 4,499,800 showed a tool holder with a retention knob as aforementioned. The first two of these patents required a manually slidable external sleeve to actuate a locking mechanism. U.S. Pat. No. 4,499,800 required an externally applied rotatable handle to be manually rotated to lock onto the retention knob.

U.S. Pat. No. 4,088,008 disclosed a springurged transverse pin in a male member which was depressed during insertion of the male member and snapped into a groove to lock, with a twisting motion to release.

U.S. Pat. No. 4,619,566 required relative rotation between the tool holder and socket during insertion and disclosed drive keys on the tool socket to engage a notch in the flange of the tool holder.

SUMMARY OF THE INVENTION

The problem to be solved, therefore, is how to construct a combined self-locking tool and socket body which will be of simpler construction so that the tool holder may be loaded and unloaded by a robot or other tool changer without separate actuation of any locking device on the socket.

This problem is solved by a self-locking tool and socket body combination with a longitudinal axis and the socket body having a socket, said combination comprising a tool holder having a male section to be received in the socket, an annular V-groove on said tool holder, a first wedge surface movable in said tool holder laterally of said axis, spring means acting on said first wedge cam surface urging it laterally outwardly, a first wedge follower surface in said socket body on one side of said socket and adapted to be engaged by said first wedge surface under urging of said spring means with the male section seated in said socket with such spring urged engagement wedging the self-locking tool substantially axially into said socket, and actuator means linked to said first wedge surface and adapted to be engaged by tool grippers of a tool loading device as such tool grippers seat into said annular V-groove to laterally inwardly move said first wedge surface against the urging of said spring means to a position whereat said first wedge surface is laterally inboard of said first wedge follower surface on said socket body to permit said tool holder to be inserted or withdrawn from said socket.

Accordingly, an object of the invention is to provide a self-locking tool and socket body combination wherein the action of tool grippers of a tool loading device unlocks the tool holder to permit the tool holder to be inserted or withdrawn from the socket.

Another object of the invention is to provide a wedge surface moved by tool grippers to a release position and with spring means in the tool holder urging the wedge surface toward a wedge follower surface in the socket body for self-locking.

Other objects and a fuller understanding of the invention may be had by referring to the following description and claims, taken in conjunction with the accompanying drawings.

DESCRIPTION OF THE PREFERRED EMBODIMENTS

Figure 1:
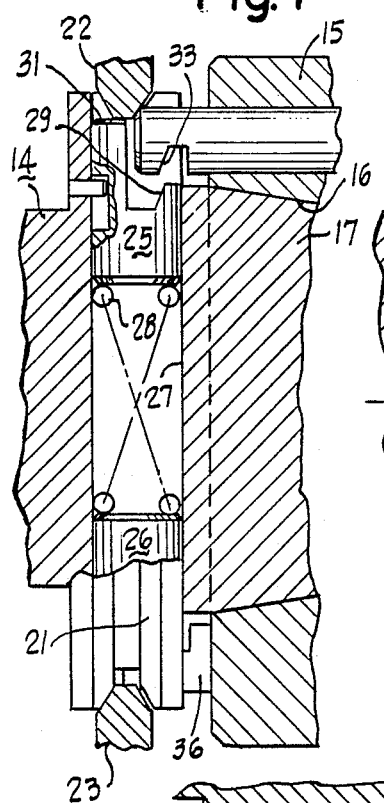
FIG. 1 is a longitudinal, sectional view through a tool holder and socket body, with a tool holder gripping the tool holder.
Figure 2:
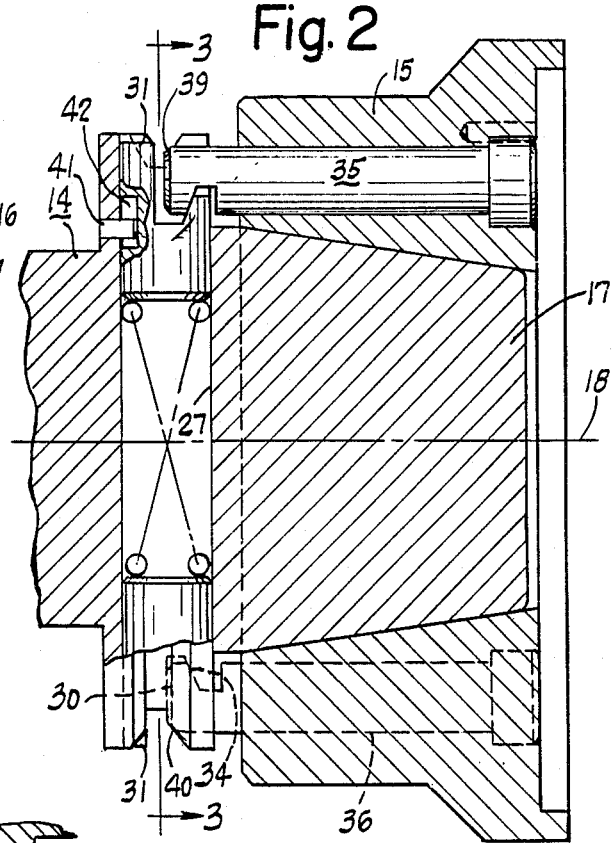
FIG. 2 is a similar longitudinal, sectional view showing the tool holder locked in the socket.
Figure 3:
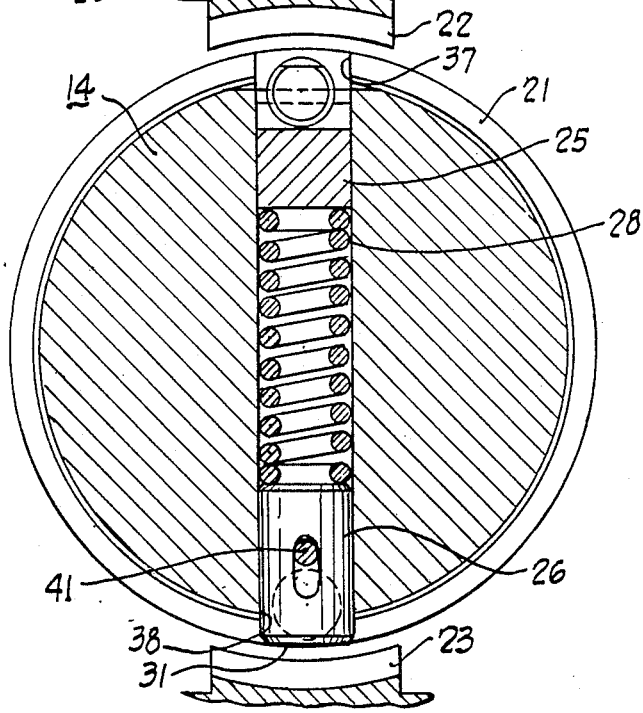
FIG. 3 is a sectional view on line 3—3 of FIG. 2.

FIGS. 1, 2, and 3 show a first embodiment of a self-locking tool and socket body combination which includes generally a tool holder 14 and a socket body 15. The socket body 15 has a socket 16 adapted to complementarily receive a male section 17 of the tool holder 14. In some tool holders and sockets, this socket is cylindrical, but in others, as shown in FIGS. 1 and 2, this socket has a standard conical taper. The tool holder 14 may be adapted to mount a number of different tools of different sizes, the tools not being shown, since this is standard practice. The socket body 15 may be non-rotatable for use in a number of machine tools, or may be mounted on a rotatable spindle, and in either case a longitudinal axis 18 is common to both tool holder 14 and socket 15.

The tool holder has an annular V-groove 21 for the usual purpose of being engageable by tool grippers 22 and 23 of a tool loading device, the remainder of which is not shown, but which may be the usual robot or automatic tool loader. Such tool grippers 22 and 23 have a V-shaped end to be generally complementary to the V-shape of the annular groove 21.

A first and second plunger 25 and 26, respectively, are each mounted for movement in the tool holder 14. Each is mounted in a lateral aperture, and in the embodiment of FIGS. 1-3, this is a diametral aperture 27, with the plungers near each end of such aperture 27. Spring means 28 is shown as a coil compression spring acting between the plungers 25 and 26, urging them laterally outwardly. First and second wedge surfaces 29 and 30 are carried on the first and second plungers 25 and 26, respectively. Actuator means 31 in this embodiment is a radially outer surface of each of the plungers 25 and 26, and is linked to the first and second wedge surfaces 29 and 30. This actuator means 31 is adapted to be engaged by the tool grippers 22 and 23, so that the plungers 25 and 26 are depressed radially inwardly as the tool grippers 22 and 23 seat into the annular V-groove 21.

First and second wedge follower surfaces 33 and 34 are mounted on the socket body 15, and in this embodiment, they are mounted on pins 35 and 36, respectively, which extend parallel to the axis 18. The outer end of these pins, i.e., the left end as viewed in FIGS. 1 and 2, are received within notches 37 and 38, respectively, in the annular V-groove 21, and take the place of the usual drive keys which assure torque transfer from a rotating spindle to the tool holder 14. Thus, these pins 35 and 36 act as torque tool drivers, axial locking pins, and rotary positioners. Each pin 35 and 36 has an ejection surface 39 and 40, respectively, on the outer end thereof. This ejection surface is tapered to generally match the V-shape of the respective tool gripper 22 and 23. Keys 41 are provided in the tool holder 14, and fit within a groove 42 in each plunger 25 and 26 to retain the orientation of each plunger so that the respective wedge surface may coact with the corresponding wedge follower surface. Such groove also coacts with the pin 41 to retain the plunger within the diametral aperture 27.

Operation

A tool holder 14 is loaded into the socket 16 by the tool grippers 22 and 23, contracting upon the annular V-groove 21 in an orientation such that these tool grippers engage the actuator means 31 and move them laterally inwardly. This could be when the tool holder is removed from the usual tool storage magazine of the machine tool. The tool grippers 22 and 23 move the plungers 25 and 26 inwardly against the urging of the spring means 28 into the position shown in FIG. 1. In this condition, the wedge surfaces 29 and 30 are forced inwardly to a position laterally inboard of the wedge follower surfaces 33 and 34, thus permitting the tool holder 14 to be inserted or withdrawn from the socket 16. With the male section 17 positioned in the socket 16, the tool grippers 22 and 23 are then released laterally outwardly from the axis 18, and the spring means 28 force the plungers 25 and 26 laterally outwardly during this releasing movement. Before the tool grippers 22 and 23 have completely released the annular V-groove 21, the wedge surfaces 29 and 30 will axially locked behind the wedge follower surfaces 33 and 34, respectively. As the tool grippers are completely released, as shown in FIG. 2, the wedge surfaces 29 and 30 coact with the wedge follower surfaces 33 and 34 to firmly axially seat the male section 17 in the socket 16. Where this is a conical seat, the tool holder is firmly seated in the socket. Each wedge surface wedges itself tightly into the respective wedge follower surface with a high force. Where the socket body 15 is a rotating spindle, then centrifugal force locks the tool holder 14 even tighter.

When the tool grippers 22 and 23 again are positioned to grip the annular V-groove 21 for the purpose of removing the tool holder 14 from the socket 16, the final bit of contracting movement causes the tool grippers to engage the ejection surfaces 39 and 40, and this wedges the tool holder 14 axially out of the socket 16. This assists tool breakaway from its seated position, because the ejection surfaces 39 and 40 project very slightly into the V-groove 21. This ejection feature is very useful after heavy-duty machining work has been performed, particularly where high thrust forces have been encountered.

Figure 4:
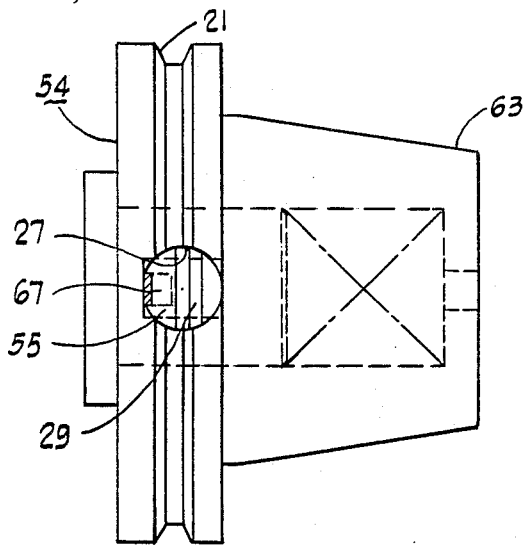
FIG. 4 is a plan view of a second embodiment of the tool holder.
Figure 5:
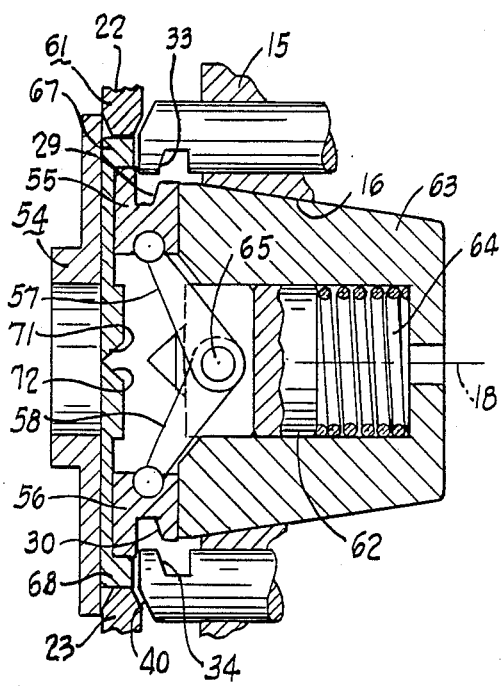
FIG. 5 is a longitudinal, sectional view of this second embodiment, showing the tool holder unlocked.
Figure 6:
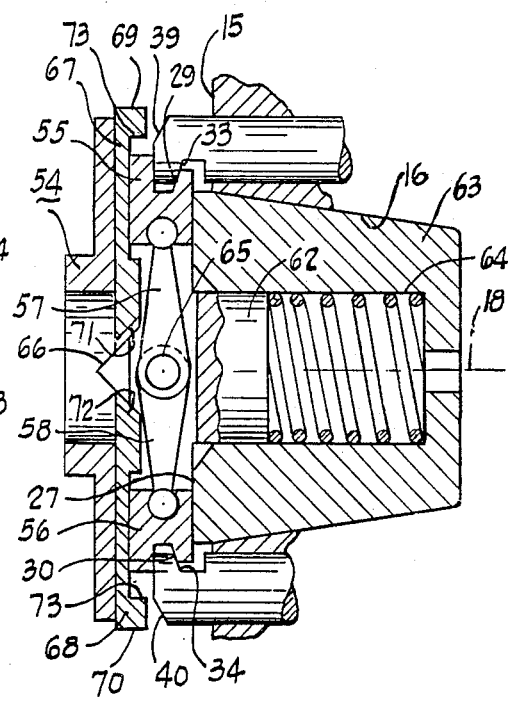
FIG. 6 is a similar longitudinal, sectional view, showing the tool holder in the locked condition.

FIGS. 4, 5, and 6 show a second embodiment of the invention utilizing a different tool holder 54, which may be received in the same socket body 15. The tool holder 54 again has the diametral aperture 27, which is cylindrical to receive cylindrical plungers 55 and 56. Each of these plungers again carries the first and second wedge surfaces 29 and 30, respectively, and toggle linkage 57, 58 is provided in the actuator means 61. A member 62 is slidable longitudinally within the tool holder male section 63, and is urged by spring means 64 to the left as viewed in FIGS. 4, 5, and 6. The knee of the toggle links 57, 58 is a pivot pin 65 on member 62, and a wedge 66 is unitary with the left end of the member 62, as viewed in these figures. Actuator plungers 67 and 68 are rectangular in cross section and slide laterally within rectangular apertures partially within the plungers 55 and 56. These actuator plungers have actuator surfaces 69 and 70 on the radial outer ends thereof to be engaged by the tool grippers 22 and 23. The radially inner ends of these actuator plungers carry actuator cams 71 and 72 to coact with the wedge 66.

Operation

FIG. 5 shows the tool grippers 22 and 23 gripping the annular V-groove 21 at the actuator plungers 67 and 68. This depresses the plungers toward the axis 18, and the actuator cams 71 and 72 act on the wedge 66 to move the member 62 to the right against the urging of the spring means 64. This partly collapses the toggle links 57 and 58. A ledge 73 on each actuator plunger 67 and 68 engages the outer ends of the plungers 55 and 56 to move them laterally inwardly so that the wedge surfaces 29 and 30 are radially inboard of the wedge follower surfaces 33 and 34. In this condition, the tool holder 54 may be inserted into and removed from the socket 16. With the male section 63 placed in the socket 16, the tool grippers 22 and 23 may be released by the tool changing mechanism. During this releasing movement, the wedge surfaces 29 and 30 move radially outwardly to engage the wedge follower surfaces 33 and 34 to axially secure the tool holder within the socket 16. The toggle links 57 and 58 straighten, as shown in FIG. 6. and this toggle linkage materially increases the locking force acting between the wedge surface and respective wedge follower surface to firmly axially seat the male section 63 in the socket 16. Again, if this is a rotatable socket, the centrifugal force on the plungers 55 and 56 will still further increase the locking force.

When the tool grippers 22 and 23 are again used to grip the annular V-groove 21, the first contracting movement will engage the actuator surfaces 69 and 70 to move these plungers 67 and 68 radially inwardly. The actuator cams 71 and 72 coact with the wedge 66 to move the member 62 longitudinally to the right and break the knee of the toggle. The ledges 73 provide the latter portion of inward movement of the plungers 55 and 56. When the wedge surfaces 20 and 30 are positioned radially inboard of the wedge follower surfaces 33 and 34, the tool holder 54 is ready to be removed longitudinally from the socket 16. The same ejection feature utilizing the ejection surfaces 39 and 40 is provided in this embodiment as in FIGS. 1 to 3.

Figure 9:
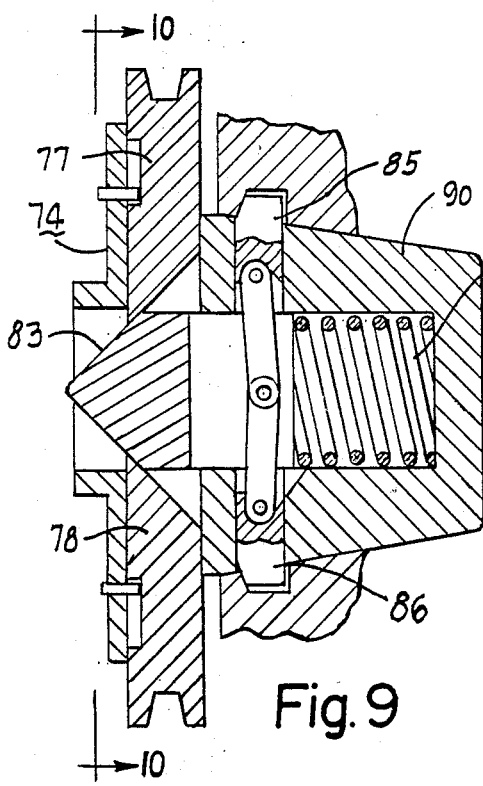
FIG. 9 is a longitudinal, sectional view similar to FIG. 7, with the tool holder in the locked condition.
Figure 10:
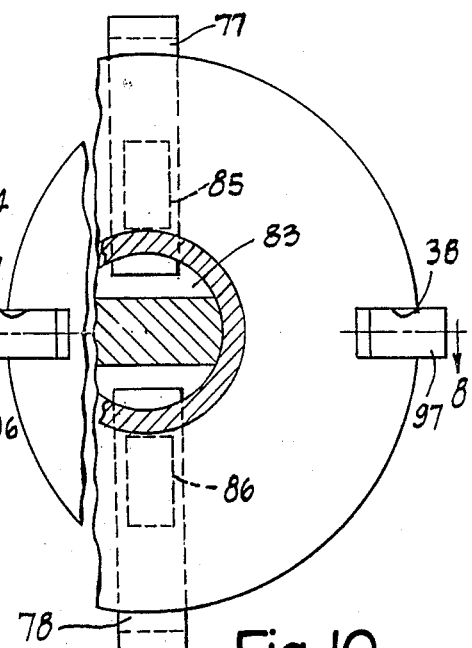
FIG. 10 is a sectional view on line 10—10 of FIG. 8.

FIGS. 7-10 illustrate a third embodiment of the invention, with a tool holder 74 which is adapted to be received inside a socket body 75. Actuator plungers 77 and 78 may be rectangular in cross section, but are shown as cylindrical and are slidable within a lateral aperture 79, which in this case is again a diametral aperture. Actuator cams 81 and 82 are on the inner end of the plungers 77 and 78, and coact with a wedge 83 on a longitudinally movable member 84, again urged to the left by spring means 64. Toggle links 57 and 58 are mounted on a toggle link pivot pin 65 on the member 84. First and second wedge 85 and 86 are laterally slidable in lateral apertures 87 and 88, respectively. In this embodiment, these apertures are not in the annular V-groove 21; instead, they are axially to the right in these FIGS. 7, 8, and 9, and are disposed in the male section 90 of this tool holder 74. In this embodiment, the lateral apertures 87 and 88 are parts of a diametral aperture shown as rectangular in cross section, and the first and second wedges 85 and 86 each carry wedge surfaces 91 and 92 to coact with first and second wedge follower surfaces 93 and 94, respectively, in the socket body 75. For convenient machining, these wedge follower surfaces 93 and 94 may be one edge of an annular locking groove machined into the socket body 75, although the wedge follower surfaces 93 and 94 will be two diametrally opposed portions on this groove. As shown in FIG. 10, torque drive keys 96 and 97 may be positioned arcuately at positions different from the wedges 65 and 86, such as 90 degrees therefrom, with the drive keys being received in the notches 37 and 38 of the annular V-groove 21.

Operation

Figure 7:
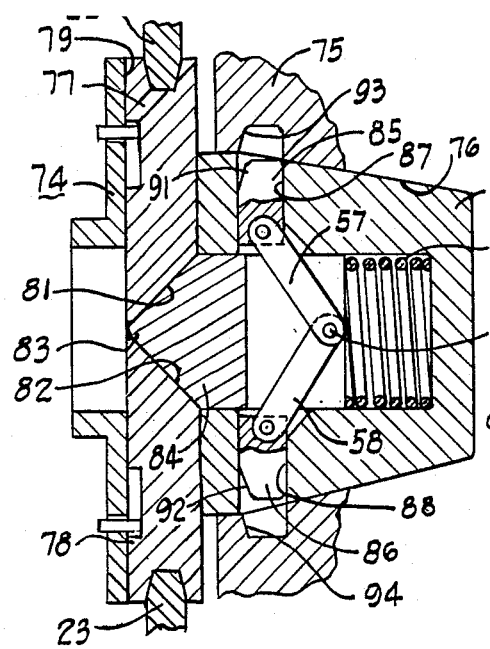
FIG. 7 is a partial sectional view of a third embodiment of the tool holder, with the tool holder in the unlocked condition.
Figure 8:
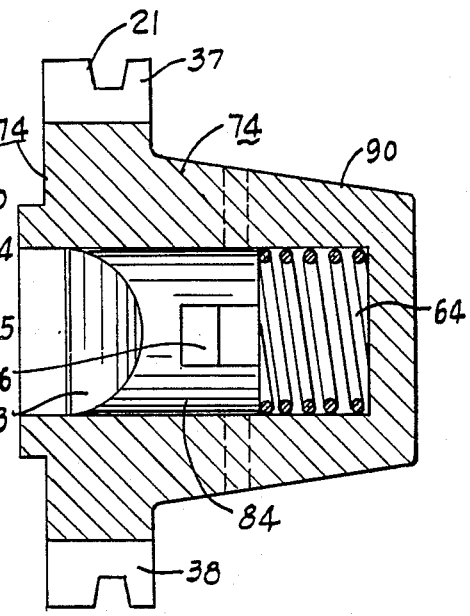
FIG. 8 is a sectional view of the third embodiment, taken on line 8—8 of FIG. 10.

FIG. 7 shows the tool grippers 22 and 23 engaging the V-groove 21 and the outer end of the actuator plungers 77 and 78, and contracting them radially inwardly so that the actuator cams 81 and 82 coact with the wedge 83 and move the member 84 to the right, as shown in FIG. 7. This is against the urging of the spring 64 and partially collapses the toggle links 57 and 58 to retract the wedge surfaces 91 and 92. They are retracted to a position radially inboard of the wedge follower surfaces 93 and 94, respectively, and in this condition, the tool holder 74 may be inserted into or withdrawn from the socket 76.

FIG. 9 shows the tool grippers 22 and 23 released from the annular V-groove 21. During this releasing movement, the wedges 85 and 86 move radially outwardly under the urging of the spring means 64. This straightens the toggle links 57 and 58, so that they are straight or nearly straight as shown in FIG. 9, and with the wedge surfaces 91 and 92 engaged with the wedge follower surfaces 93 and 94. Again, this forces the male section 90 tightly axially into seating engagement with the socket 76. Also, if the socket body 75 is a rotating spindle, centrifugal force acting on the wedges 85 and 86 will increase this locking force. Again, an ejection feature may be incorporated into a portion of the actuator plungers 77 and 78 coacting with an ejection surface on the socket body 75.

In all three embodiments, it will be noted that the actuator means is linked to at least the first wedge surface and is adapted to be engaged by tool grippers to laterally inwardly move the first wedge surface against the urging of the spring means. This gripping position of the tool grippers 22 and 23, as shown in FIGS. 1, 4, and 7, moves the first wedge surface laterally inwardly against the urging of the spring means to a position whereat the first wedge surface is laterally inboard of the first wedge follower surface on the socket body. This permits the tool holder to be inserted into or withdrawn from the socket.

In all cases, the wedge surfaces move laterally relative to the longitudinal axis 18, and the wedge surface is at a small acute angle to the path of movement of the wedge surface. The wedge surface might be exactly perpendicular to the longitudinal axis 18 and the path of movement at a small acute angle thereto, although in all three embodiments the path of movement is shown to be in a plane normal to the axis 18 and the wedge surface is at a small acute angle relative to this normal plane. These diametral apertures 27 and 79 are a means to guide the movement of the actuator means substantially perpendicularly to the axis as being actuated by the tool grippers.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A self-locking tool and socket body combination with a longitudinal axis and the socket body having a socket, said combination comprising:

a tool holder having a male section to be received in the socket;

an annular V-groove on said tool holder;

a first wedge surface movable in said tool holder laterally of said axis;

spring means acting on said first wedge surface urging it laterally outwardly;

a first wedge follower surface acting on said socket body on one side of said socket and adapted to be engaged by said first wedge under urging of said spring means with the male section seated in said socket with such spring urged engagement wedging the self-locking tool substantially axially into said socket; and actuator means linked to said first wedge surface and adapted to be engaged by tool grippers of a tool loading device as such tool grippers seat into said annular V-groove to laterally inwardly move said first wedge surface against the urging of said spring means to a position whereat said first wedge surface is laterally inboard of said first wedge follower surface on said socket body to permit said tool holder to be inserted or withdrawn from said socket.

2. A tool and socket body combination as set forth in claim 1, including an ejection surface acting on said socket body engageable by one of the tool grippers as it seats into said annular V-groove to force said tool holder male section in an axial direction out of said socket body.

3. A tool and socket body combination as set forth in claim 1, wherein said actuator means is disposed in said annular V-groove.

4. A tool and socket body combination as set forth in claim 1, wherein said wedge surface is at a small acute angle to the path of movement of said wedge surface.

5. A tool and socket body combination as set forth in claim 1, wherein a lateral aperture is located in said annular V-groove, and said first wedge surface is movable in said aperture.

6. A tool and socket body combination as set forth in claim 1, wherein a lateral aperture is located in said male section of said tool holder body and said first wedge surface is movable in said aperture.

7. A tool and socket body combination as set forth in claim 1, including means to guide movement of said actuator means substantially perpendicularly to said axis.

8. A tool and socket body combination as set forth in claim 1, including a first pin in said socket body having said first wedge follower surface.

9. A tool and socket body combination as set forth in claim 8, including an ejection surface on said first pin engageable by one of the tool grippers as it is contracting to force said tool holder male section out of said socket.

10. A tool and socket body combination as set forth in claim 1, including a second wedge surface movable in said tool holder and acted on by said spring means;
   a second wedge follower surface in said socket body adapted to the engaged by said second wedge surface; and
   said actuator means being linked to said second wedge surface.

11. A tool and socket body combination as set forth in claim 10, including a substantially diametrical aperture through said tool holder with a wedge surface near each end.

12. A tool and socket body combination as set forth in claim 10, including a substantially diametrical aperture through said tool holder, and first and second wedges having said first and second wedge surface, respectively, in opposite ends of said aperture.

13. A tool and socket body combination as set forth in claim 12, including a single spring acting directly between and first and second wedges.

14. A tool and socket body combination as set forth in claim 13, wherein said actuator means is a radially outer surface on each of said first and second wedges.

15. A tool and socket body combination as set forth in claim 12, including a toggle mechanism in said actuator means.

16. A tool and socket body combination as set forth in claim 15, wherein said aperture is located in said annular V-groove.

17. A tool and socket body combination as set forth in claim 15, wherein said aperture is located in said male section of said tool holder.

18. A tool and socket body combination as set forth in claim 15, including plungers radially slidable in said aperture and each having an outer end as said actuator means.

19. A tool and socket body combination as set forth in claim 18, including in said actuator means a member slidable substantially axially and urged in one direction by said spring means.

20. A tool and socket body combination as set forth in claim 19, including means connecting the knee of said toggle mechanism to said member.

21. A tool and socket body combination as set forth in claim 18, wherein said wedges and said plungers are disposed substantially in the plane of said annular V-groove.

22. A tool and socket body combination as set forth in claim 18, wherein said wedges are disposed in said male section of said tool holder body.

* * * * *